(12) United States Patent
Kim et al.

(10) Patent No.: US 11,425,430 B2
(45) Date of Patent: Aug. 23, 2022

(54) ELECTRONIC DEVICE FOR SHARING REAL-TIME CONTENT DATA

(71) Applicant: Samsung Electronics Co., Ltd., Suwon-si (KR)

(72) Inventors: Hyunkyoung Kim, Suwon-si (KR); Youjin Im, Suwon-si (KR); Gilhong Min, Suwon-si (KR); Daewook Jeon, Suwon-si (KR); Beomseok Chae, Suwon-si (KR); Soonyeon Choi, Suwon-si (KR); Eunji Choi, Suwon-si (KR); Sangjin Han, Suwon-si (KR); Miseon Hwang, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/971,476

(22) PCT Filed: Feb. 22, 2019

(86) PCT No.: PCT/KR2019/002191
§ 371 (c)(1),
(2) Date: Aug. 20, 2020

(87) PCT Pub. No.: WO2019/164326
PCT Pub. Date: Aug. 29, 2019

(65) Prior Publication Data
US 2020/0389675 A1 Dec. 10, 2020

(30) Foreign Application Priority Data

Feb. 23, 2018 (KR) .................. 10-2018-0021846

(51) Int. Cl.
*H04N 21/2187* (2011.01)
*H04N 21/414* (2011.01)
(Continued)

(52) U.S. Cl.
CPC ..... *H04N 21/2187* (2013.01); *H04N 21/2393* (2013.01); *H04N 21/2743* (2013.01);
(Continued)

(58) Field of Classification Search
CPC .......... H04N 21/2187; H04N 21/2393; H04N 21/2743; H04N 21/4122; H04N 21/41407;
(Continued)

(56) References Cited

U.S. PATENT DOCUMENTS 8,327,012 B1   12/2012   Nguyen et al.
8,760,553 B2    6/2014   Hwang et al.
(Continued)

FOREIGN PATENT DOCUMENTS

EP    2 688 268 A1      1/2014
JP    2015-126415 A     7/2015
(Continued)

OTHER PUBLICATIONS

European Search Report dated Oct. 30, 2020, issued in European Application No. 19756504.7-1208 / 3739891.
(Continued)

*Primary Examiner* — Alazar Tilahun
(74) *Attorney, Agent, or Firm* — Jefferson IP Law, LLP

(57) ABSTRACT

Disclosed is an electronic device. The electronic device comprises: a display; a communication circuit; a memory; and at least one processor, wherein the at least one processor may: receive, from a first server, a list of at least one external device registered with the first server, display the list through the display; receive a selection input for a first external device included in the list; obtain information for providing real-time content from a second server to the first external device; generate real-time content data; upload the real-time content data to the second server through the communication (Continued)

circuit while generating the real-time content data; and transmit at least a part of the information to the first external device through the first server such that the first external device can obtain the real-time content data. In addition, other various embodiments appreciated from the specification are also possible.

13 Claims, 11 Drawing Sheets

(51) Int. Cl.
    *H04N 21/41* (2011.01)
    *H04N 21/472* (2011.01)
    *H04N 21/2743* (2011.01)
    *H04N 21/4223* (2011.01)
    *H04N 21/422* (2011.01)
    *H04N 21/239* (2011.01)

(52) U.S. Cl.
    CPC ... *H04N 21/4122* (2013.01); *H04N 21/41407* (2013.01); *H04N 21/4223* (2013.01); *H04N 21/42203* (2013.01); *H04N 21/472* (2013.01)

(58) Field of Classification Search
    CPC ......... H04N 21/42203; H04N 21/4223; H04N 21/472; H04N 21/4432; H04N 21/414
    See application file for complete search history.

(56) References Cited

U.S. PATENT DOCUMENTS

| | | |
|---|---|---|
| 9,461,949 B2 | 10/2016 | Grue |
| 9,635,076 B2 | 4/2017 | Rhyu et al. |
| 10,148,715 B2 | 12/2018 | Rhyu et al. |
| 2008/0201451 A1 | 8/2008 | Yu et al. |
| 2012/0072961 A1 | 3/2012 | Marignan et al. |
| 2012/0185607 A1 | 7/2012 | Rhyu et al. |
| 2012/0303797 A1* | 11/2012 | Mathur ............... H04L 65/4092 709/224 |
| 2013/0028132 A1* | 1/2013 | Choi ..................... H04L 12/282 370/254 |
| 2013/0073622 A1 | 3/2013 | Nguyen et al. |
| 2014/0025847 A1 | 1/2014 | Choi et al. |
| 2015/0350358 A1 | 12/2015 | Nguyen et al. |
| 2015/0350691 A1 | 12/2015 | Nguyen et al. |
| 2015/0355804 A1 | 12/2015 | Nguyen et al. |
| 2017/0083460 A1 | 3/2017 | Choi et al. |
| 2017/0085642 A1* | 3/2017 | Grue .................... H04L 65/403 |
| 2017/0230436 A1 | 8/2017 | Rhyu et al. |
| 2019/0020914 A1* | 1/2019 | Zhang ................ H04L 65/1073 |
| 2019/0141102 A1 | 5/2019 | Rhyu et al. |

FOREIGN PATENT DOCUMENTS

| | | |
|---|---|---|
| KR | 10-2012-0034900 A | 4/2012 |
| KR | 10-2012-0083744 A | 7/2012 |
| KR | 10-1406243 B1 | 6/2014 |
| KR | 10-1457360 B1 | 11/2014 |
| KR | 10-2016-0083675 A | 7/2016 |
| KR | 10-1821145 B1 | 1/2018 |
| WO | 2017/219347 A1 | 12/2017 |

OTHER PUBLICATIONS

Chinese Office Action with English translation dated Dec. 16, 2021; Chinese Appln. No. 201980014779.3.
Korean Office Action with English translation dated Jun. 23, 2022; Korean Appln. No. 10-2018-0021846.

\* cited by examiner

ELECTRONIC DEVICE FOR SHARING REAL-TIME CONTENT DATA

TECHNICAL FIELD

Various embodiments disclosed herein relate to a technique of sharing real-time content between different electronic devices.

BACKGROUND ART

There is an increasing demand to share content data generated in one electronic device with other electronic devices. For example, the electronic device may share content in such a manner to transmit content data, which has been generated, to another electronic device through a network. However, it is difficult to share content data generated in real time in the manner described above.

DISCLOSURE

Technical Problem

The electronic device may use an application that provides a streaming service to share content data (e.g., video data being recorded or speech data being recorded) generated in real time. However, in this case, the real-time content data may be obtained only when a target device with which the content data is shared installs a relevant application and directly accesses the real-time content data through an account.

Various embodiments disclosed herein provide a real-time content sharing method and an electronic device supporting the same, capable of sharing content data generated in real time to various output devices (e.g., display devices, speakers) under IoT environment.

Technical Solution

According to an embodiment disclosed herein, an electronic device may include a display, a communication circuit, a memory, and at least one processor, and the at least one processor may receive, from a first server, a list of at least one external device registered in the first server and display the list through the display, receive an input for selecting a first external device included in the list, acquire information for providing real-time content from a second server to the first external device, generate real-time content data, upload the real-time content data to the second server through the communication circuit while generating the real-time content data, and transmit at least a part of the information to the first external device through the first server such that the first external device acquires the real-time content data.

According to an embodiment disclosed herein, a real-time content data sharing method of an electronic device may include displaying a list of at least one external device registered in a first server by a first user account of the electronic device through a display, receiving a selection input for a first external device included in the list, receiving information for providing real-time content to the first external device from a second server, generating real-time content data, uploading the real-time content data to the second server through the communication circuit while generating the real-time content data, and transmitting at least a part of the information to the first external device through the first server such that the first external device acquires the real-time content data.

According to various embodiments disclosed above, an electronic device may include a display, a communication circuit, a memory, and at least one processor, and the at least one processor may receive a sharing request of an external device for real-time content from a first server and display a notification for the sharing request through the display, acquire address information from the first server when a confirmation input is received in response to the notification, and access a second server based on the address information and receive real-time content data from the second server.

Advantageous Effects

According to various embodiments disclosed herein, real-time content data may be shared remotely between electronic devices that are authenticated through the same account or are invited to the account and obtained authority.

In addition, various effects may be provided that are directly or indirectly understood through the disclosure.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
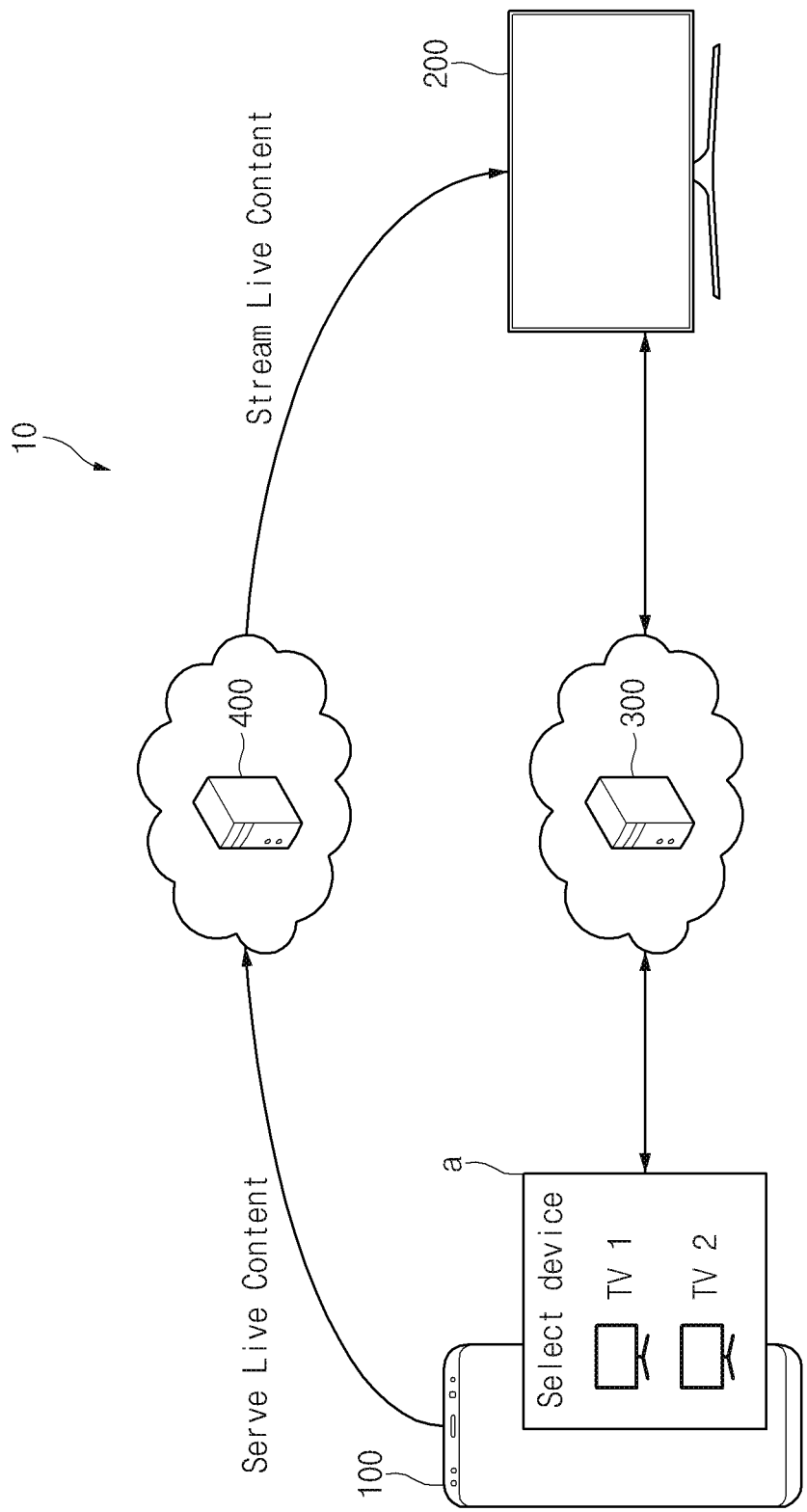
FIG. 1 illustrates a system for sharing real-time content according to an embodiment.
Figure 2:
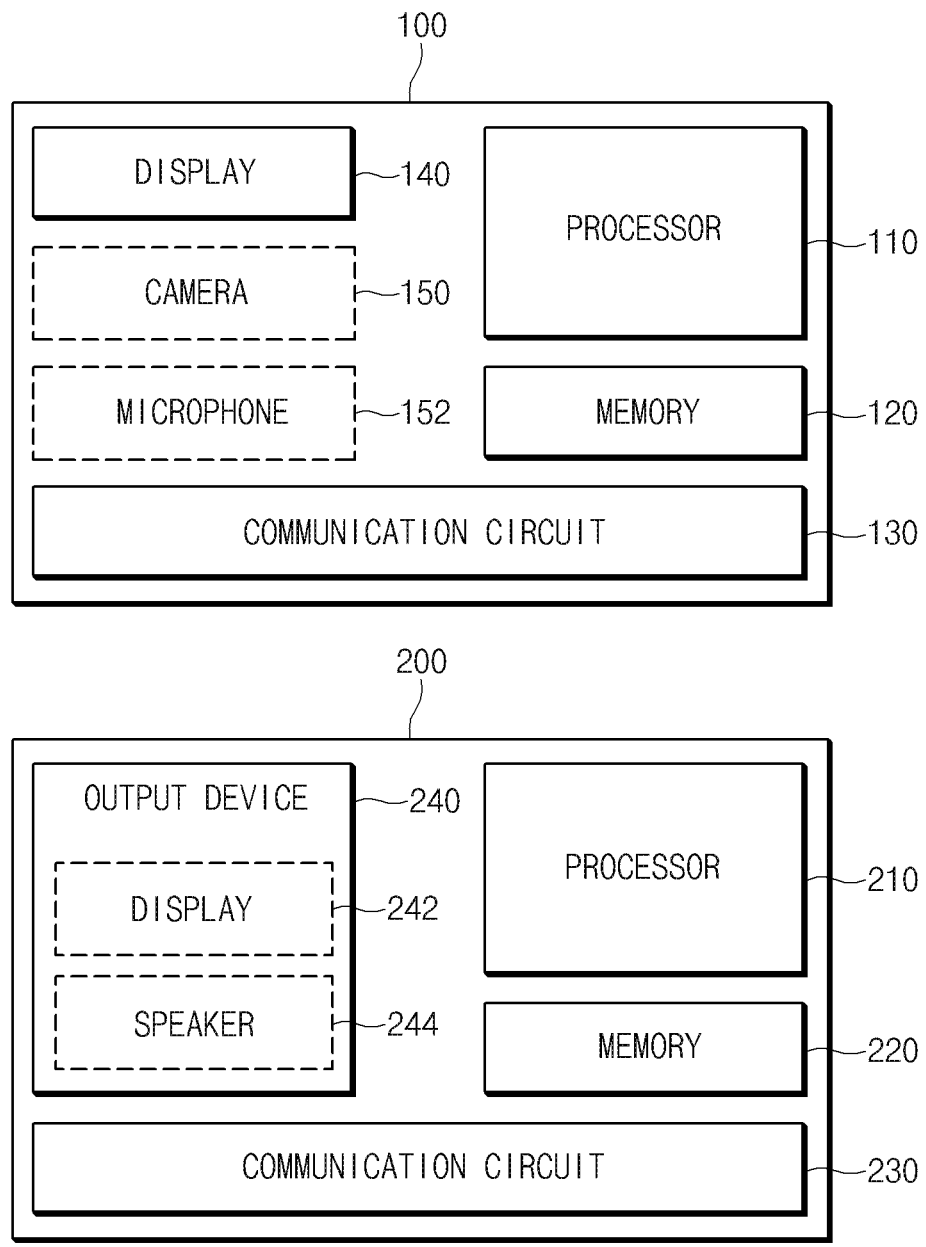
FIG. 2 is a block diagram of an electronic device and an external device according to an embodiment.

FIG. 1 illustrates a system for sharing real-time content according to an embodiment. FIG. 2 is a block diagram of an electronic device and an external device according to an embodiment.

Referring to FIGS. 1 and 2, a system 10 for sharing real-time content data (hereinafter, referred to as the system 10) according to an embodiment may include an electronic device 100 and an external device 200. The electronic device 100 may generate real-time content data. The content data generated in real time by the electronic device 100 may be shared with the external device 200.

In one embodiment, the electronic device 100 may be referred to as a mobile device such as a smart phone. The electronic device 100 may include a processor 110, a memory 120, a communication circuit 130, and a display 140. In one embodiment, the electronic device 100 may further include a camera 150 or a microphone 152. The electronic device 100 may generate real-time content data using the camera 150 or the microphone 152.

In one embodiment, the external device 200 may be referred to as an electronic device including an output device (e.g., a display or speaker) such as TV, refrigerator, PC or tablet PC. The external device 200 may include a processor 210, a memory 220, a communication circuit 230, and an output device 240. The output device 240 may include, for example, a display 242 and/or a speaker 244.

In one embodiment, the system 10 may include at least one server. The at least one server may include a first server 300 and a second server 400. In one embodiment, the first server 300 may manage and control the external device 200 having authority to receive shared real-time content data of the electronic device 100. For example, the external device 200 may be registered in the first server 300 by a user of the electronic device 100. In one embodiment, the second server 400 may provide a data streaming service. The second server 400 may receive real-time content data from the electronic device 100 and provide a streaming service for the real-time content data to the external device 200.

In one embodiment, the electronic device 100 may receive a sharing request for real-time content data from a user. In response to the request, the electronic device 100 may request a list of external devices 200 having authority to share a real-time content file from the first server 300. The first server 300 may transmit a list of external devices 200 registered in the first server 300 to the electronic device 100. The electronic device 100 may display a list (a) received from the first server 300 through the display 140. The electronic device 100 may receive an input for selecting one external device 200 among the external devices 200 included in the displayed list (a). The selected external device 200 may be referred to as the external device 200 which is to receive shared real-time content data from the electronic device 100.

The electronic device 100 may receive necessary information from the second server 400 to stream the content data generated in real time to the external device 200. Based on the information, the electronic device 100 may upload the real-time content data generated in real time to the second server 400. For example, the electronic device 100 may generate real-time video data using the camera 150 and upload the real-time video data to the second server 400. For another example, the electronic device 100 may generate real-time audio data using the microphone 152 and upload the real-time audio data to the second server 400. Hereinafter, a scenario in which the electronic device 100 generates and shares real-time video data using the camera 152 is described as an example. However, the disclosure is not limited thereto, and the real-time content data may include a variety of content data such as speech data, image data, and video data generated in real time.

In one embodiment, the electronic device 100 may transmit at least a part of the information received from the second server 400 to the external device 200. The external device 200 may receive real-time content data uploaded to the second server 400 through streaming based on the received information. In one embodiment, the information may include a first address (e.g., URL) through which the electronic device 100 is able to upload real-time content data, and a second address (e.g., URL) through which the external device 200 is able to access the uploaded real-time content data. For example, the electronic device 100 may upload content data generated in real time to a first address of the second server 400. In the upload operation, the electronic device 100 may transmit a second address of the second server 400 to the external device 200 through the first server 300. The external device 200 may access the second address of the second server 400 and receive the uploaded real-time content data through streaming. In various embodiments, when the first address is identical to the second address, the electronic device 100 may receive only one address value of the first address and the second address from the second server 400.

In one embodiment, the external device 200 may reproduce real-time content data provided through streaming. According to an embodiment, the external device 200 may include an application operated by the second server 400. The external device 200 may execute the application and receive and reproduce real-time content data using the application. For another example, the external device 200 may receive and reproduce real-time content data through a web browser. The web browser may be referred to as a mandatory program installed in the external device 200 in advance. According to the web browser, even when there is no program (e.g., an application operated by the second server 400) separately installed in the external device 200, the electronic device 100 may share real-time content data with the external device 200.

In various embodiments, the electronic device 100 and the external device 200 may be registered in the first server 300 by the same user account (e.g., the first account). The first server 300 may determine the external device 200 registered by the first account of the electronic device 100 as the external device 200 capable of receiving shared real-time content data from the electronic device 100.

In various embodiments, the electronic device 100 may invite the external device 200 that is to receive shared real-time content data. For example, a user of the electronic device 100 may log in to the first account and invite the external device 200 that is to receive shared real-time content data. The first server 300 may transmit an invitation request message to the external device 200 based on the invitation operation of the electronic device 100, and register the external device 200 as the external device 200 having authority to receive shared real-time content data.

In various embodiments, the electronic device 100 may log in using a user account (e.g., a second account) subscribed to a streaming service provided by the second server 400. After logging in, the electronic device 100 may request address information (e.g., a first address and a second address) from the second server 400. After the external device 200 logs in to the streaming service using the same second account, the external device 200 may receive real-time content data uploaded from the electronic device 100 through streaming.

Figure 3:
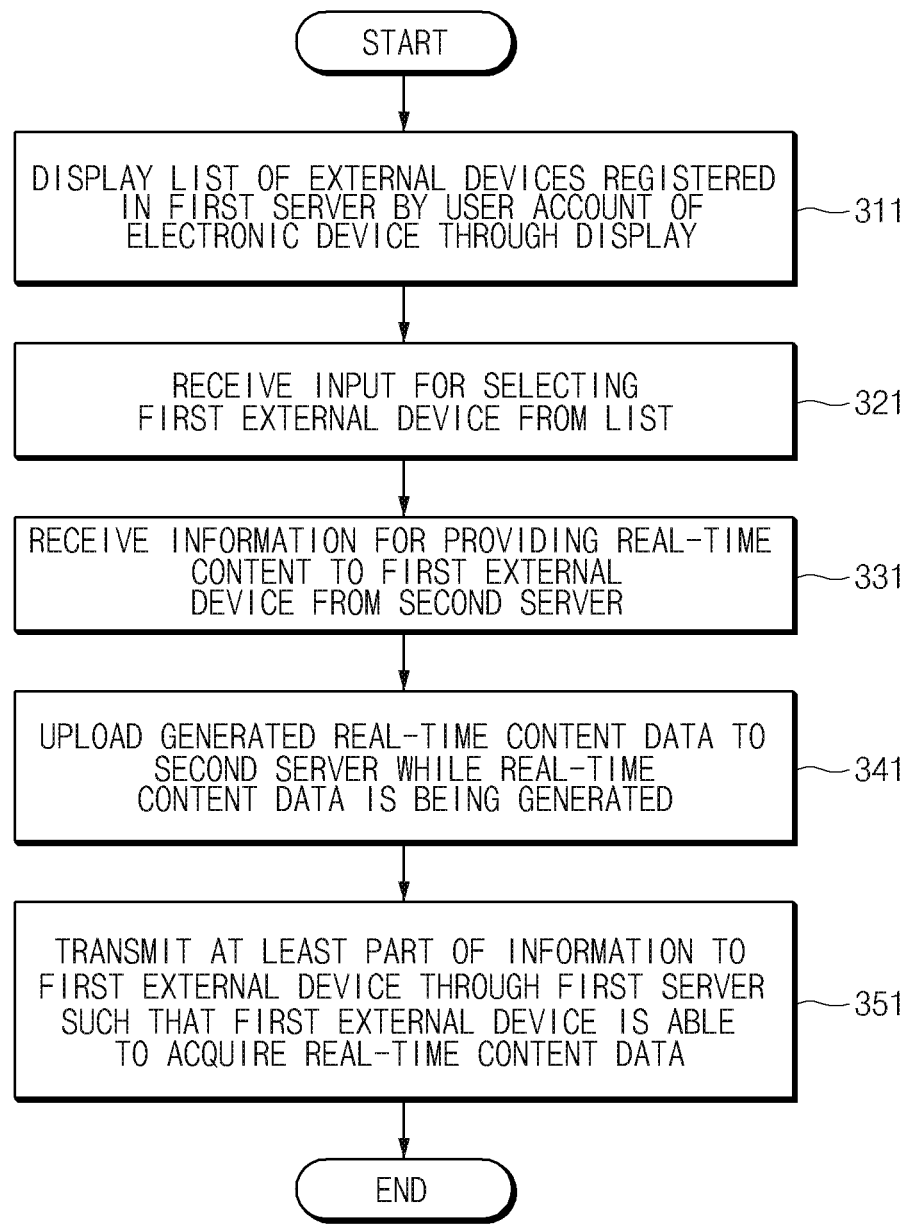
FIG. 3 illustrates a method for sharing real-time content according to an embodiment.
Figure 4:
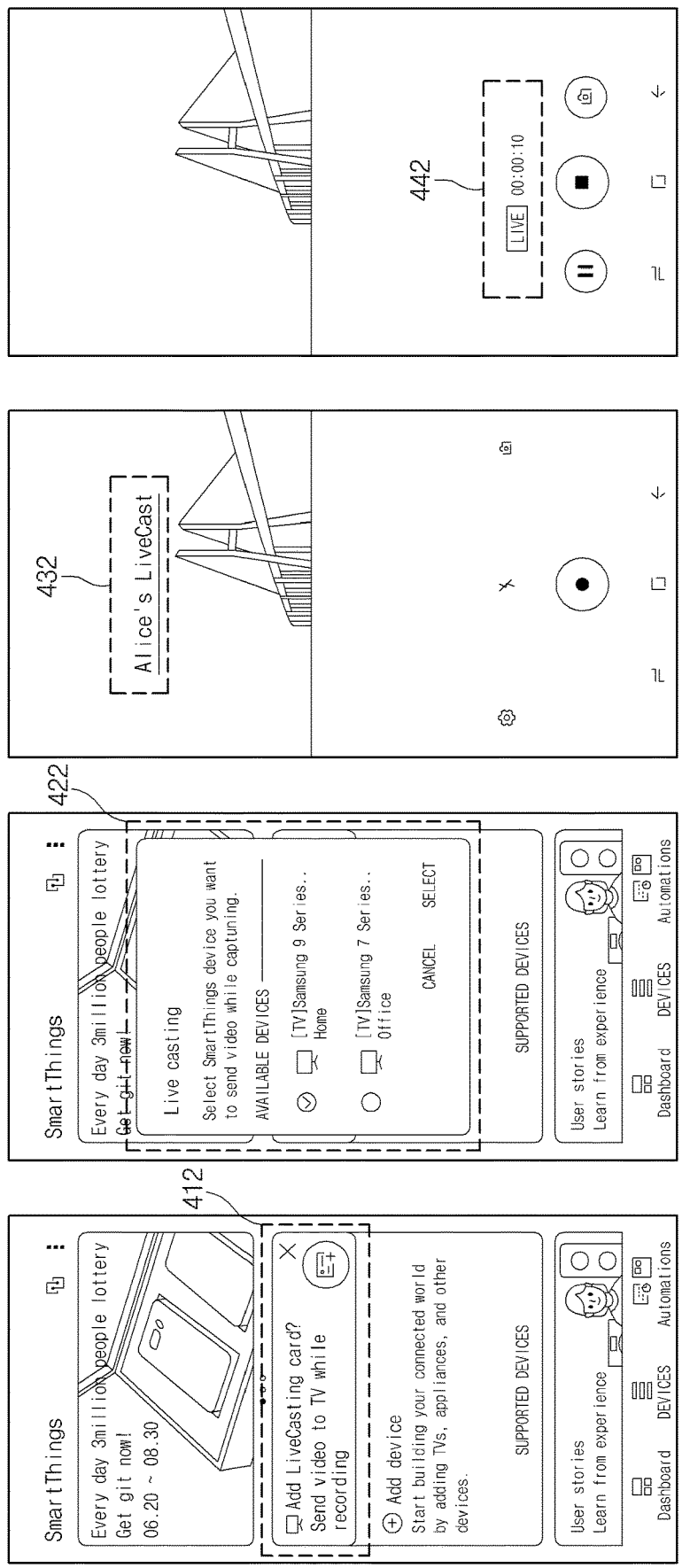
FIG. 4 illustrates examples of screen interfaces displayed on an electronic device to share real-time content according to an embodiment.

FIG. 3 illustrates a method for sharing real-time content according to an embodiment. FIG. 4 illustrates examples of screen interfaces displayed on an electronic device to share real-time content according to an embodiment.

Referring to FIG. 3, a method for sharing real-time content according to an embodiment may include operations 311 to 351. The operations 311 to 351 may be performed by, for example, an electronic device (100 of FIG. 2) shown in FIG. 2. Each of the operations 311 to 351 may be implemented with instructions (commands) that may be performed (or executed) by a processor (110 of FIG. 2) of the electronic device 100, for example. The instructions may be stored in, for example, a computer recording medium or a memory (120 of FIG. 2) of the electronic device 100 shown in FIG. 2.

FIG. 4 may be referred to in the following descriptions for the operations 311 to 351. Referring to FIG. 4, the electronic device 100 may display screens 410 to 440 through a display (140 of FIG. 2).

Referring to FIGS. 3 and 4, in operation 311, the electronic device 100 may display, through the display 140, a list of external devices (200 in FIG. 1) registered in a first server (300 of FIG. 1) as the user account identical to the user account (e.g., first account) of the electronic device 100.

In one embodiment, when a sharing request for real-time content data occurs, the electronic device 100 may request a list of external devices 200 having authority to receive shared the real-time content data from the first server 300. The first server 300 may transmit a list of external devices 200 registered in the first server 300 to the electronic device 100 in response to the request.

In one embodiment, the electronic device 100 may detect generation of a sharing request for real-time content data. For example, when a touch input to a button 412 displayed on the screen 410 is received through the screen 410, the electronic device 100 may detect a sharing request for real-time content data.

Referring to the screen 420, the electronic device 100 may display a list 422 of external devices 200 received from the first server 300. For example, a TV placed in the house and a TV placed in the office may be displayed as external devices 200 capable of receiving the shared content.

In operation 321, the electronic device 100 may receive an input for selecting the external device 200 which occurs on the displayed list 422. Hereinafter, the selected external device 200 may be separately described as a first external device 200. For example, an input for selecting a TV placed in the house may be received through the screen 420. Referring to the screen 430, a text 432 indicating that sharing of real-time content data has started may be displayed through the display 140.

In operation 331, the electronic device 100 may receive information for providing real-time content data to the first external device 200 from the second server 400.

In one embodiment, when the first external device 200 is selected, the electronic device 100 may request information necessary for providing real-time content data to the second server 400. For example, the information may include an address (e.g., URL) that enables access to the second server 400.

In operation 341, the electronic device 100 may generate real-time content data. The electronic device 100 may upload the real-time content data to the second server 400 while the real-time content data is being generated.

In one embodiment, the electronic device 100 may start recording using a camera (150 in FIG. 2). The electronic device 100 may upload real-time content data being generated by the recording to the second server 400 while performing recording using the camera 150. For example, the electronic device 100 may access the second server 400 and upload real-time content data based on the address information received from the second server 400.

Referring to the screen 440, a text 442 indicating that recording using the camera 150 has started may be displayed through the display 140. A video being recorded by the camera 150 may be displayed on the screen 440, and real-time video data corresponding to the video may be generated. The generated real-time video data may be uploaded to the second server 400 in real time.

In one embodiment, the electronic device 100 may generate speech data recorded by the microphone 152 included in the electronic device 100. In this case, real-time speech data may be uploaded to the second server 400. Hereinafter, with respect to the generated real-time content data, real-time video data generated by the camera 150 may be described as an example.

In operation 351, the electronic device 100 may transmit at least a part of information received from the second server 400 to the first external device 200 through the first server 300 such that the first external device 200 is able to acquire the real-time content data. For example, the electronic device 100 may transmit address information that enables access to the uploaded real-time content data to the first server 300. The first server 300 may transmit the received address information to the first external device 200. In other words, the first server 300 may mediate transmission and reception of information data between the electronic device 100 and the first external device 200. The first external device 200 may access the second server 400 and acquire real-time content data based on the received address information. In various embodiments, operations 341 and 351 may be performed substantially simultaneously.

Figure 5:
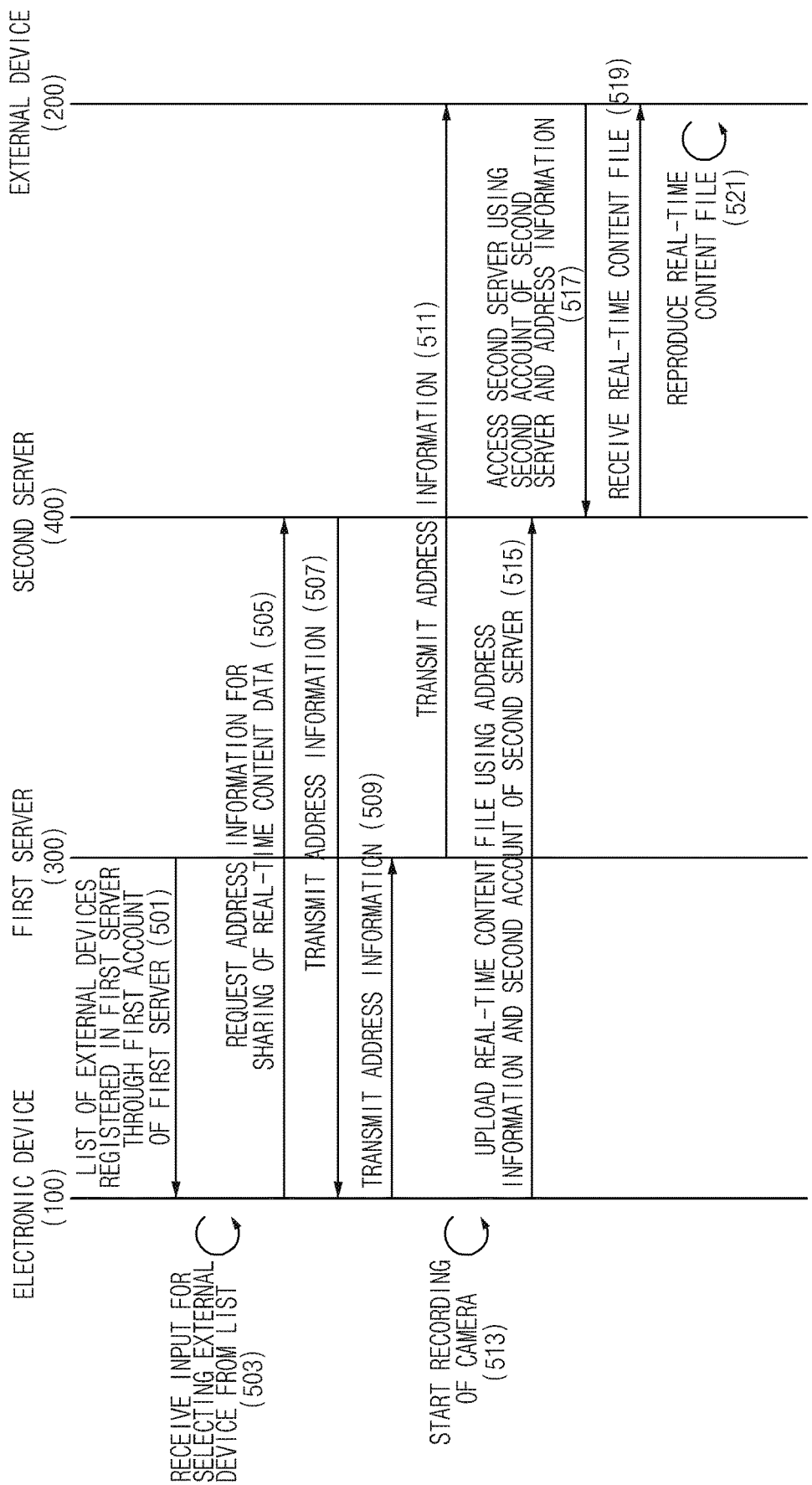
FIG. 5 is a signal flow diagram of a real-time content sharing system according to an embodiment.

FIG. 5 is a signal flow diagram of a real-time content sharing system according to an embodiment.

In one embodiment, the system 10 (e.g., the system 10 of FIG. 1) may include the electronic device 100, the first server 300, the second server 400, and the external device 200.

In one embodiment, when a sharing request for content occurs, the first server 300 may transmit a list of external devices 200 registered through a first account of the first server 300 to the electronic device 100 (501). Also, the first server 300 may transmit a list of external devices 200 invited by the first account to the electronic device 100 together with the list of the registered external devices 200. The first account may be referred to as a user account of the electronic device 100. The electronic device 100 may log in to the first server 300 through the first account. The first server 300 may generate and manage a list of external devices 200 registered using the first account of the first server 300 or invited by the first account. For example, the first server 300 may map and store a unique number of the external device 200 into the first account.

The electronic device 100 may display the list received from the first server 300 through a display (140 of FIG. 2). The electronic device 100 may receive an input for selecting at least one external device 200 included in the list (503).

The electronic device 100 may request address information for sharing of real-time content data from the second server 400 (505). For example, the electronic device 100 may log in to the second server 400 through a second account of the second server 400. The second account may be referred to as an account of the second server 400 used by the user of the electronic device 100.

The second server 400 may transmit address information to the electronic device 100 in response to the request of the electronic device 100 (507). The electronic device 100 may transmit the address information to the first server 300 (509), and the first server 300 may transmit the received address back to the external device 200 (511). For example, address information for the second server 400 provided to the external device 200 may be transmitted from the electronic device 100 to the external device 200 through the first server 300. Accordingly, the external device 200 that has been authenticated through the first account may have authority to access real-time content data. When the address information is received from the second server 400, the electronic device 100 may start recording using a camera (140 of FIG. 2) (513). The electronic device 100 may upload content data being generated in real time through recording to the second server 400 using the address information and the second account. For example, the electronic device 100 may log in to the second server 400 through the second account and upload the real-time content data to the address received from the second server 400. When the electronic device 100 has already logged in to the second server 400, the login operation may be omitted in operation 515.

The external device 200 may log in to the second server 400 using the second account and access the second server 400 using the received address information (517). The external device 200 may access the address to which the real-time content data has been uploaded and receive the real-time content data through streaming (519). The external device 200 may reproduce the streaming real-time content data, and output the real-time content data through a screen or speech through the output device (240 of FIG. 2).

Figure 6:
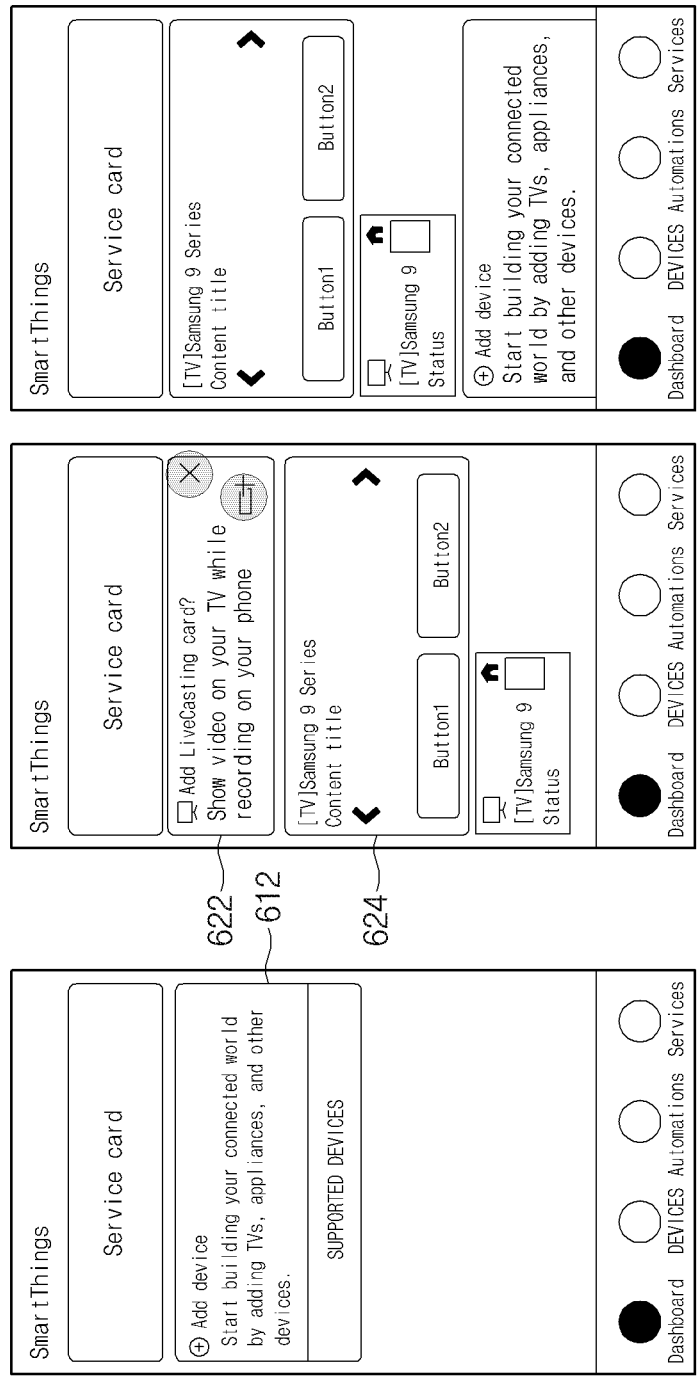
FIG. 6 illustrates examples of screen interfaces displayed on an electronic device to register an external device to share real-time content according to an embodiment.

FIG. 6 illustrates examples of screen interfaces displayed on an electronic device to register an external device to share real-time content according to an embodiment.

In various embodiments, an electronic device (100 of FIG. 2) may provide an interface for registering an external device (200 of FIG. 2). For example, screens 610 to 640 may be displayed through a display (140 of FIG. 2) of the electronic device 100.

Referring to screen 610, the electronic device 100 may display an interface 612 when there is no external device 200 registered in advance. The interface 612 may be referred to as an interface that recommends a service for sharing real-time content data. For example, the interface 612 may be disposed on a status display bar or popped up through a notification window. When a touch input on the interface 612 is received, the electronic device 100 may perform a registration procedure for a new external device 200.

Referring to screen 620, the electronic device 100 may display the external device 200 capable of sharing real-time content data. For example, the electronic device 100 may display information about the external device 200 that is currently sharing real-time content data or is capable of sharing real-time content data, on the notification window 624. For example, the notification window 624 may include, for example, information associated with the external device 200 (e.g., name, type and/or status), a title of content currently being played, and/or a control button. The screen 620 may include an interface 622 for adding a new external device 200 to currently share real-time content data.

Referring to screen 630, when a cancel button (e.g., x button) for the interface 622 of the screen 620 is touched, the interface 622 may be removed.

Figure 7A:
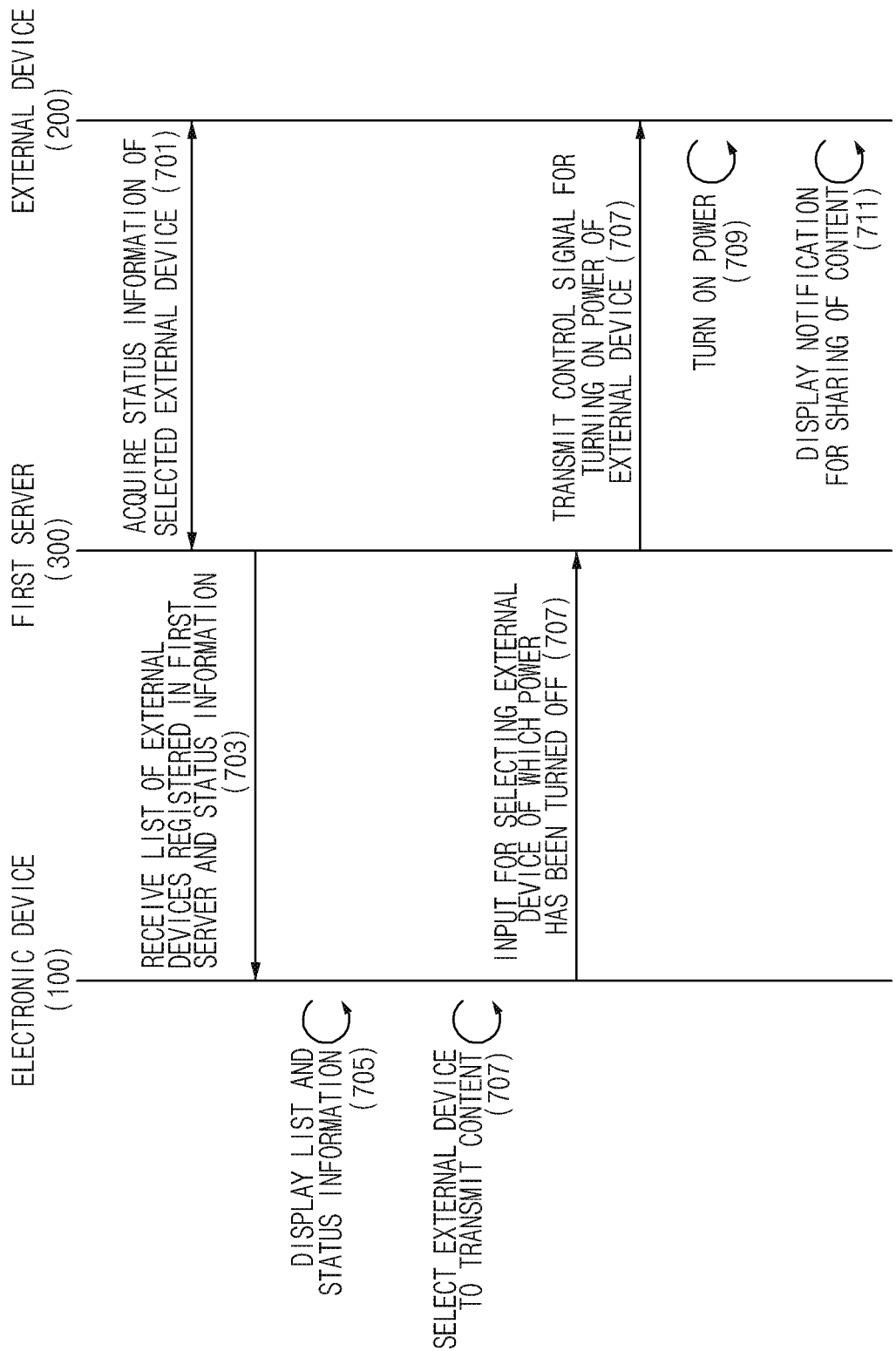
FIG. 7A is a signal flow diagram of a real-time content sharing system according to an embodiment.
Figure 7B:
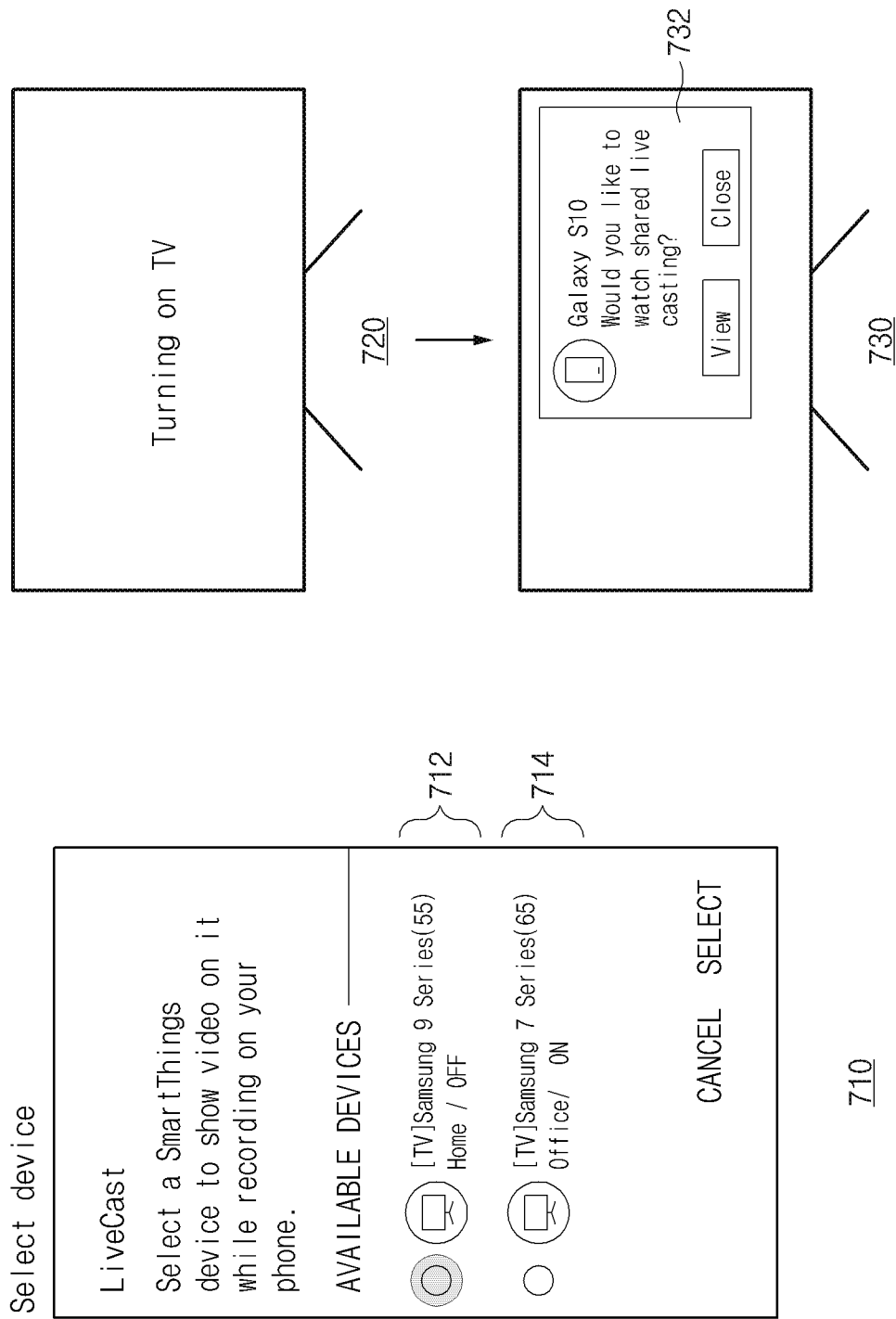
FIG. 7B illustrates screen interfaces of an electronic device and an external device according to various embodiments.

FIG. 7A is a signal flow diagram of a real-time content sharing system according to an embodiment. FIG. 7B illustrates screen interfaces of an electronic device and an external device according to various embodiments.

In one embodiment, the first server 300 may acquire status information of the external device 200 by performing communication with the selected external device 200 in connection with sharing of real-time content data (701). For example, the first server 300 may acquire status information regarding on/off of the power of the external device 200. The electronic device 100 may receive a list of external devices 200 registered in the first server 300 and status information of the external devices 200 together from the first server 300 (703).

The electronic device 100 may display the received list through the display (140 of FIG. 2) (705). In various embodiments, when displaying the list, the electronic device 100 may also display the status information of the external device 200. For example, referring to screen 710 of FIG. 7B, the electronic device 100 may display the name and status information of the external device 200 together. For example, it may be displayed that a TV 712 of Samsung 9 series is placed in the house, and the power is turned off. Alternatively, it may be displayed that a TV 714 of the Samsung 7 series is placed in the office, and the power is turned on.

In one embodiment, the electronic device 100 may receive an input for selecting the external device 200 (e.g., Samsung 9 series TV 712) of which the power is turned off (707). In response to the selection input, the electronic device 100 may transmit a control signal which causes the selected external device 200 to turn on the power through the first server 300. For example, the electronic device 100 may transmit the selection input to the first server 300 (707). Accordingly, the first server 300 may transmit a control signal which causes the external device 200 to turn on the power to the external device 200 (709). The external device 200 may turn on the power (709) and display a content sharing notification (711).

Referring to FIG. 7B, the external device 200 may turn on the power (screen 720), and display a content sharing notification 732 through a display (242 of FIG. 2) (screen 730). When a selection input for the content sharing notification 732 is received, operations 517 to 521 in FIG. 5 may be performed.

Figure 8:
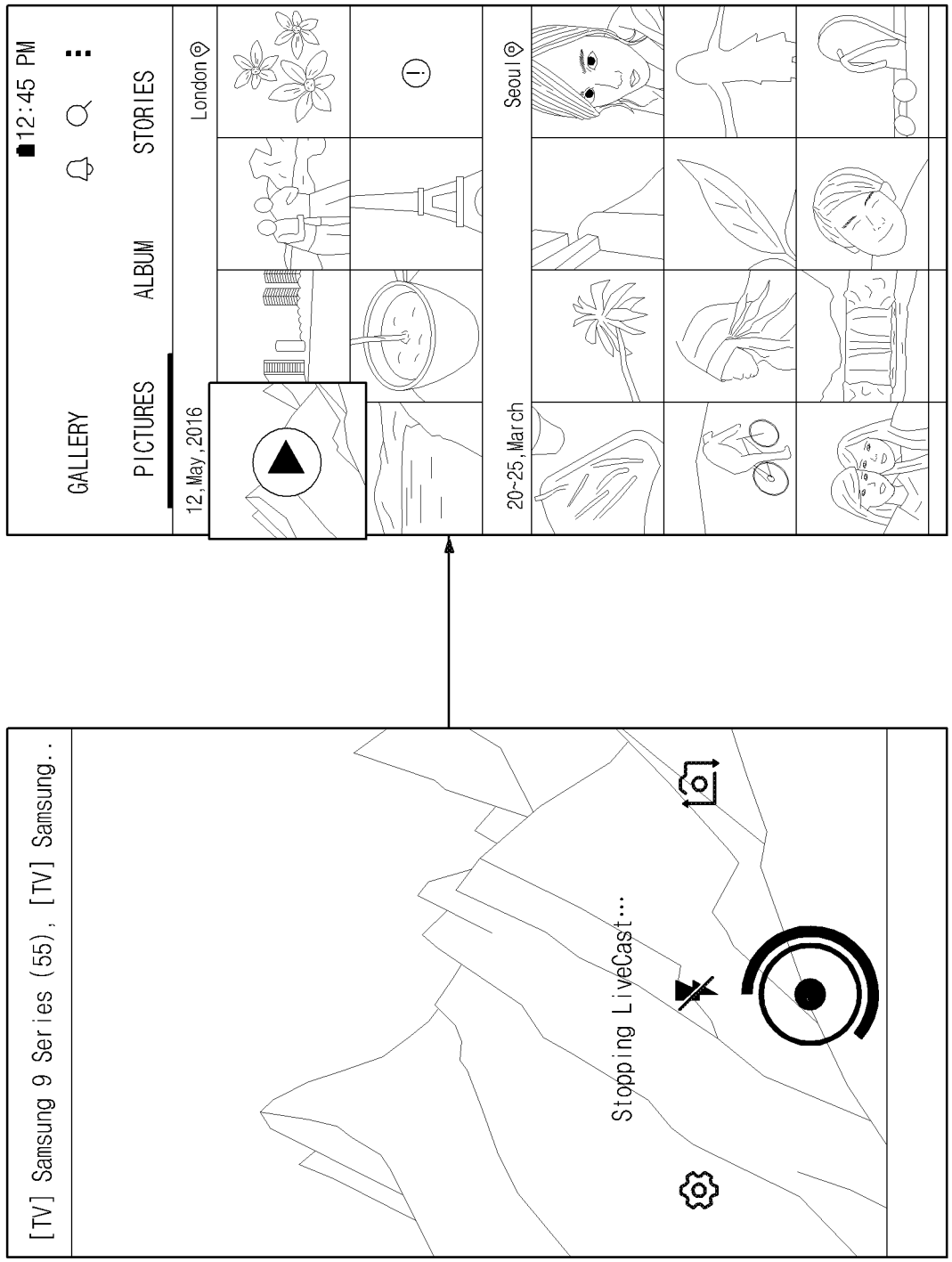
FIG. 8 illustrates an example of a screen in which an electronic device finishes recording in various embodiments.

FIG. 8 illustrates an example of a screen in which an electronic device finishes recording in various embodiments.

In one embodiment, when recording for generating real-time content data is finished, an electronic device (100 of FIG. 2) may store real-time video data which has been recorded during the recording in a memory (120 of FIG. 2). For example, the electronic device 100 may display an interface (e.g., an icon) for requesting storing of the real-time video data through a display (140 of FIG. 2). When receiving an input for storing real-time content data, the electronic device 100 may store the real-time content data in response to the input.

Screen 810 and screen 820 of FIG. 8 may be output through the display 140 of the electronic device 100. When the recording is finished in screen 810, the recorded real-time video data may be stored in the electronic device 100. When the real-time video data is stored, a file corresponding to the stored real-time video data may be displayed as shown in screen 820.

Figure 9:
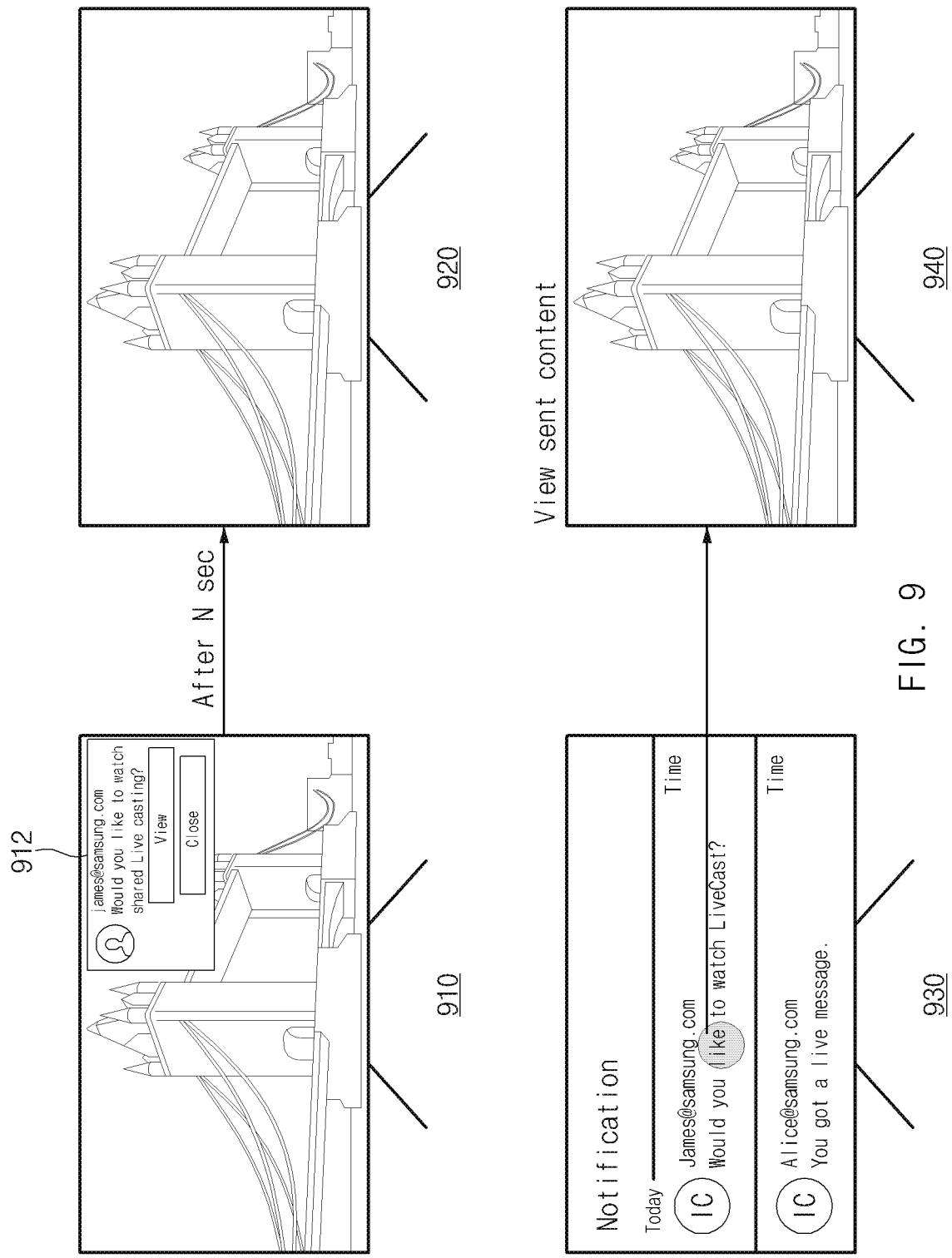
FIG. 9 illustrates examples of screen interfaces displayed on an external device in various embodiments.

FIG. 9 illustrates examples of screen interfaces displayed on an external device in various embodiments.

Referring to FIG. 9, screens 910 to 940 that may be displayed through a display (242 of FIG. 2) of an external device (200 of FIG. 2) are exemplarily illustrated.

Referring to screen 910, when a sharing request to share real-time content data is received, the external device 200 may display a content sharing notification 912. The external device 200 may remove the content sharing notification 912 when a confirmation input is not received for a specified period of time with respect to the content sharing notification 912. In addition, the external device 200 may store information associated with the request to share real-time content data in a memory (220 of FIG. 2).

For example, the information associated with the sharing request may include a user account of a user of the electronic device 100 which is registered in a first server (300 of FIG. 1) and has transmitted the sharing request. For example, when a sharing request is received from the electronic device 100 registered using a first account, the first account may be referred to as information on a sender of the sharing request.

Referring to screen 930, the external device 200 may display information associated with the received sharing request. The received sharing request may be accumulated and stored in the memory 220. For example, when a plurality of sharing requests is received from a plurality of accounts of the first server 300, a list representing the received sharing requests for each account may be provided. The user may be provided with shared content by selecting previously received sharing requests.

For example, when a confirmation input for the sharing request received from an account 'James@samsung.com' is received on screen 930, the external device 200 may receive and reproduce real-time content data requested to be shared from the account on the screen 940 from the second server 400.

In various embodiments, when the reception of the real-time content data from the second server 300 is finished, the external device 200 may store the received real-time content data in the memory 220. For example, the external device 200 may output an interface capable of requesting storage of content data, and when a confirmation input is received accordingly, may store real-time content data.

According to various embodiments described above, an electronic device may include a display, a communication circuit, a memory, and at least one processor, and the at least one processor may receive, from a first server, a list of at least one external device registered in the first server and display the list through the display, receive an input for selecting a first external device included in the list, acquire information for providing real-time content to the first external device from a second server, generate real-time content data, upload the real-time content data to the second server through the communication circuit while generating the real-time content data, and transmit at least a part of the information to the first external device through the first server such that the first external device acquires the real-time content data.

According to various embodiments the first external device may be registered in the first server using a first account of a user of the electronic device.

According to various embodiments, the first external device may be registered in the second server using a second account of the electronic device.

According to various embodiments, the at least one processor may acquire first address information and second address information for providing real-time content from the second server to the first external device, upload the real-time content data to the second server based on the first address information, and transmit the second address information to the first external device through the first server.

According to various embodiments, the at least one processor may receive status information of the at least one external device from the first server.

According to various embodiments, the at least one processor is configured to receive the input for selecting the first external device of which the power has been turned off, the first external device being included in the list, and transmit a control signal for causing the first external device to turn on the power to the first external device through the first server.

According to various embodiments, the at least one processor may receive status information of the power of the at least one external device from the first server and output the list and the status information of the power through the display.

According to various embodiments, the at least one external device may include a TV or a speaker.

According to various embodiments, the at least one processor may store the real-time content data in the memory when the generation of the real-time content data is finished.

According to various embodiments, the at least one processor may display an interface for determining whether to store the generated real-time content data through the display when the generation of the real-time content data is finished.

According to various embodiments, the electronic device may further include a camera, and the at least one processor may perform recording using the camera, upload real-time video data generated by the recording to the second server while the recording is being performed, and transmit the at least a part of the information to the first external device through the first server such that the first external device acquires the real-time video data.

According to various embodiments, the electronic device may further include a microphone, and the at least one processor may perform recording using the microphone, upload real-time speech data generated by the recording to the second server through the communication circuit while the recording is being performed, and transmit the at least a part of the information to the first external device through the first server such that the first external device acquires the real-time speech data.

According to various embodiments described above, a real-time content data sharing method of an electronic device may include displaying a list of at least one external device registered in a first server by a first user account of the electronic device through a display, receiving a selection input for a first external device included in the list, receiving information for providing real-time content to the first external device from a second server, generating real-time content data, uploading the real-time content data to the second server through the communication circuit while generating the real-time content data, and transmitting at least a part of the information to the first external device through the first server such that the first external device acquires the real-time content data.

According to various embodiments, the receiving of the information from the second server may include receiving first address information for uploading the real-time content data to the second server and second address information to be transmitted to the first external device as a part of the information.

According to various embodiments, the real-time content data sharing method may further include logging in to the second server using a second user account of the electronic device.

According to various embodiments described above, an electronic device may include a display, a communication circuit, a memory, and at least one processor, and the at least one processor may receive a sharing request of an external device for real-time content from a first server and display a notification for the sharing request through the display, acquire address information from the first server when a confirmation input is received in response to the notification, and access a second server based on the address information and receive real-time content data from the second server.

According to various embodiments, the electronic device may be registered in the first server using an account of a user of the external device.

According to various embodiments, the at least one processor may store information associated with the sharing request in the memory when the confirmation input is not received for a specified period of time in response to the notification.

According to various embodiments, the information associated with the sharing request may include an account of a user of an external device that is registered in the first server and has transmitted the sharing request.

According to various embodiments, the at least one processor may turn on the power of the electronic device when the sharing request is received from the first server while the power of the electronic device is turned off.

Figure 10:
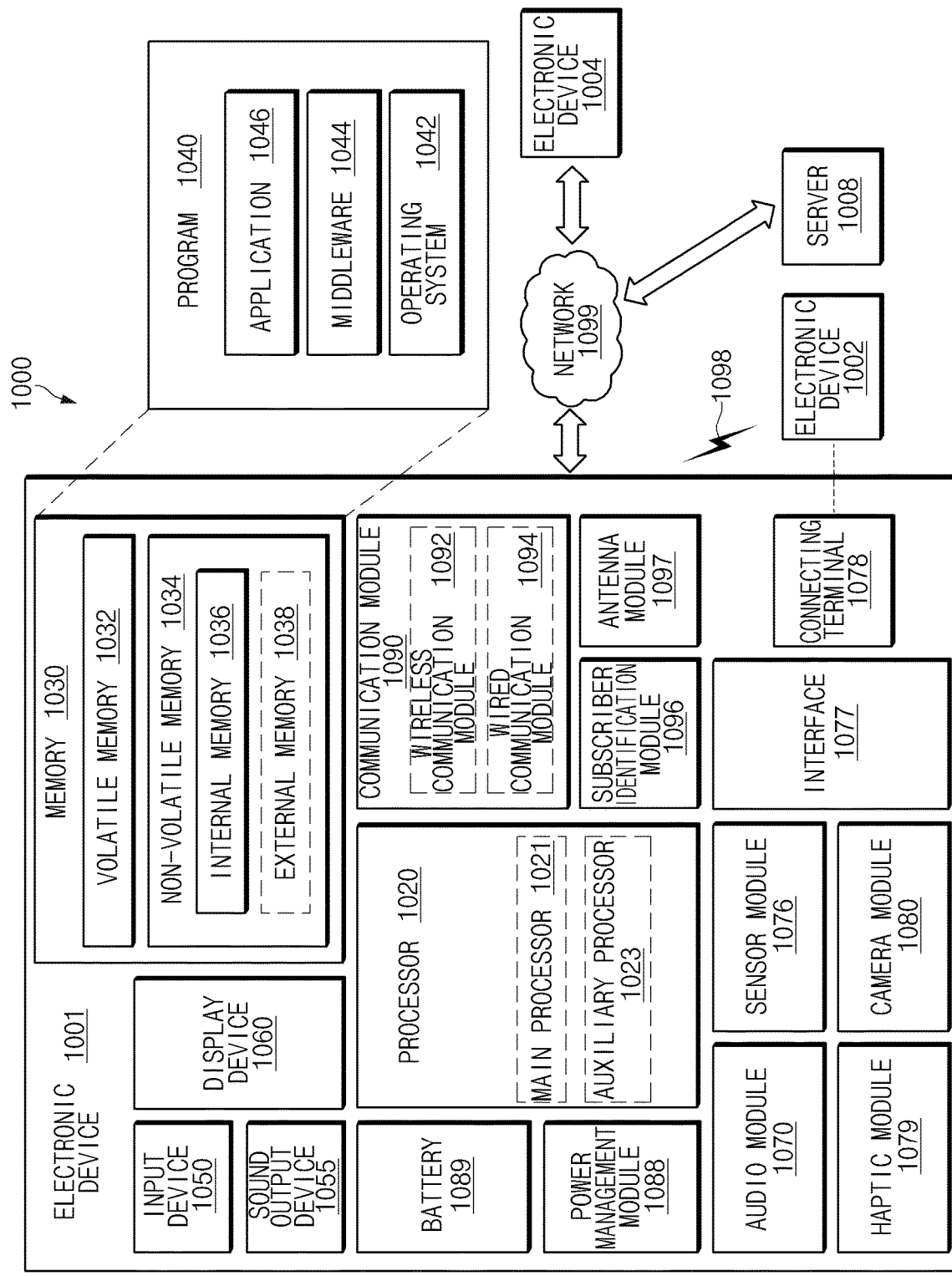
FIG. 10 illustrates an electronic device in a network environment, according to various embodiments.

FIG. 10 illustrates an electronic device 1001 in a network environment 1000, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HIMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 10, under the network environment 1000, the electronic device 1001 (e.g., the electronic device 100 of FIG. 2) may communicate with an electronic device 1002 through short-range wireless communication 1098 or may communication with an electronic device 1004 or a server 1008 through a network 1099. According to an embodiment, the electronic device 1001 may communicate with the electronic device 1004 through the server 1008.

According to an embodiment, the electronic device 1001 may include a bus 1010, a processor 1020 (e.g., the processor 110 of FIG. 1), a memory 1030 (e.g., the memory 120 of FIG. 1), an input device 1050 (e.g., the microphone 152 of FIG. 1) (e.g., a microphone or a mouse), a display device 1060 (e.g., the display 140 of FIG. 1), an audio module 1070, a sensor module 1076, an interface 1077, a haptic module 1079, a camera module 1080, a power management module 1088, a battery 1089, a communication module 1090, and a subscriber identification module 1096. According to an embodiment, the electronic device 1001 may not include at least one (e.g., the display device 1060 or the camera module 1080) of the above-described components or may further include other component(s).

The bus 1010 may interconnect the above-described components 1020 to 1090 and may include a circuit for conveying signals (e.g., a control message or data) between the above-described components.

The processor 1020 may include one or more of a central processing unit (CPU), an application processor (AP), a graphic processing unit (GPU), an image signal processor (ISP) of a camera or a communication processor (CP). According to an embodiment, the processor 1020 may be implemented with a system on chip (SoC) or a system in package (SiP). For example, the processor 1020 may drive an operating system (OS) or an application program to control at least one of another component (e.g., hardware or software component) of the electronic device 1001 connected to the processor 1020 and may process and compute various data. The processor 1020 may load a command or data, which is received from at least one of other components (e.g., the communication module 1090), into a volatile memory 1032 to process the command or data and may store the result data into a nonvolatile memory 1034.

The memory 1030 may include, for example, the volatile memory 1032 or the nonvolatile memory 1034. The volatile memory 1032 may include, for example, a random access memory (RAM) (e.g., a dynamic RAM (DRAM), a static RAM (SRAM), or a synchronous DRAM (SDRAM)). The nonvolatile memory 1034 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1034 may be configured in the form of an internal memory 1036 or the form of an external memory 1038 which is available through connection only if necessary, according to the connection with the electronic device 1001. The external memory 1038 may further include a flash drive such as compact flash (CF), secure digital (SD), micro secure digital (Micro-SD), mini secure digital (Mini-SD), extreme digital (xD), a multimedia card (MMC), or a memory stick. The external memory 1038 may be operatively or physically connected with the electronic device 1001 in a wired manner (e.g., a cable or a universal serial bus (USB)) or a wireless (e.g., Bluetooth) manner.

For example, the memory 1030 may store, for example, at least one different software component, such as a command or data associated with the program 1040, of the electronic device 1001. The program 1040 may include, for example, a kernel 1041, a library 1043, an application framework 1045 or an application program (interchangeably, "application") 1047.

The input device 1050 may include a microphone, a mouse, or a keyboard. According to an embodiment, the keyboard may include a keyboard physically connected or a virtual keyboard displayed through the display device 1060.

The display device 1060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1001.

The audio module 1070 may convert, for example, from a sound into an electrical signal or from an electrical signal into the sound. According to an embodiment, the audio module 1070 may acquire sound through the input device 1050 (e.g., a microphone) or may output sound through an output device (not illustrated) (e.g., a speaker or a receiver) included in the electronic device 1001, an external electronic device (e.g., the electronic device 1002 (e.g., a wireless speaker or a wireless headphone)) or an electronic device 1006 (e.g., a wired speaker or a wired headphone) connected with the electronic device 1001

The sensor module 1076 may measure or detect, for example, an internal operating state (e.g., power or temperature) of the electronic device 1001 or an external environment state (e.g., an altitude, a humidity, or brightness) to generate an electrical signal or a data value corresponding to the information of the measured state or the detected state. The sensor module 1076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1076 may further include a control circuit for controlling at least one or more sensors included therein. According to an embodiment, the electronic device 1001 may control the sensor module 1076 by using the processor 1020 or a processor (e.g., a sensor hub) separate from the processor 1020. In the case that the separate processor (e.g., a sensor hub) is used, while the processor 1020 is in a sleep state, the separate processor may operate without awakening the processor 1020 to control at least a portion of the operation or the state of the sensor module 1076.

According to an embodiment, the interface 1077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 1078 may physically connect the electronic device 1001 and the electronic device 1006. According to an embodiment, the connector 1078 may include, for example, an USB connector, an SD card/MMC connector, or an audio connector (e.g., a headphone connector).

The haptic module 1079 may convert an electrical signal into mechanical stimulation (e.g., vibration or motion) or into electrical stimulation. For example, the haptic module 1079 may apply tactile or kinesthetic stimulation to a user. The haptic module 1079 may include, for example, a motor, a piezoelectric element, or an electric stimulator.

The camera module 1080 may capture, for example, a still image and a moving picture. According to an embodiment, the camera module 1080 may include at least one lens (e.g., a wide-angle lens and a telephoto lens, or a front lens and a rear lens), an image sensor, an image signal processor, or a flash (e.g., a light emitting diode or a xenon lamp).

The power management module 1088, which is to manage the power of the electronic device 1001, may constitute at least a portion of a power management integrated circuit (PMIC).

The battery 1089 may include a primary cell, a secondary cell, or a fuel cell and may be recharged by an external power source to supply power at least one component of the electronic device 1001.

The communication module 1090 may establish a communication channel between the electronic device 1001 and an external device (e.g., the first external electronic device 1002, the second external electronic device 1004, or the server 1008). The communication module 1090 may support wired communication or wireless communication through the established communication channel. According to an embodiment, the communication module 1090 may include a wireless communication module 1092 or a wired communication module 1094. The communication module 1090 may communicate with the external device through a first network 1098 (e.g. a short range communication network such as Bluetooth or infrared data association (IrDA)) or a second network 1099 (e.g., a wireless wide area network such as a cellular network) through a relevant module among the wireless communication module 1092 or the wired communication module 1094.

The wireless communication module 1092 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1092 supports cellar communication, the wireless communication module 1092 may, for example, identify or authenticate the electronic device 1001 within a communication network using the subscriber identification module (e.g., a SIM card) 1096. According to an embodiment, the wireless communication module 1092 may include a communication processor (CP) separate from the processor 1020 (e.g., an application processor (AP)). In this case, the communication processor may perform at least a portion of functions associated with at least one of components 1010 to 1096 of the electronic device 1001 in substitute for the processor 1020 when the processor 1020 is in an inactive (sleep) state, and together with the processor 1020 when the processor 1020 is in an active state. According to an embodiment, the wireless communication module 1092 may include a plurality of communication modules, each supporting only a relevant communication scheme among cellular communication, short-range wireless communication, or a GNSS communication.

The wired communication module 1094 may include, for example, a local area network (LAN) service, a power line communication, or a plain old telephone service (POTS).

For example, the first network 1098 may employ, for example, Wi-Fi direct or Bluetooth for transmitting or receiving commands or data through wireless direct connection between the electronic device 1001 and the first external electronic device 1002. The second network 1099 may include a telecommunication network (e.g., a computer network such as a LAN or a WAN, the Internet or a telephone network) for transmitting or receiving commands or data between the electronic device 1001 and the second electronic device 1004.

According to various embodiments, the commands or the data may be transmitted or received between the electronic device 1001 and the second external electronic device 1004 through the server 1008 connected with the second network 1099. Each of the first and second external electronic devices 1002 and 1004 may be a device of which the type is different from or the same as that of the electronic device 1001. According to various embodiments, all or a part of operations that the electronic device 1001 will perform may be executed by another or a plurality of electronic devices (e.g., the electronic devices 1002 and 1004 or the server 1008). According to an embodiment, in the case that the electronic device 1001 executes any function or service automatically or in response to a request, the electronic device 1001 may not perform the function or the service internally, but may alternatively or additionally transmit requests for at least a part of a function associated with the electronic device 1001 to any other device (e.g., the electronic device 1002 or 1004 or the server 1008). The other electronic device (e.g., the electronic device 1002 or 1004 or the server 1008) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B," "at least one of A and/or B," "A, B, or C," or "at least one of A, B, and/or C," and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for," "having the capacity to," "changed to," "made to," "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1030).

The term "module" used herein may include a unit, which is implemented with hardware, software, or firmware, and may be interchangeably used with the terms "logic," "logical block," "part," "circuit," or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1030) in the form of a program module. The instruction, when executed by a processor (e.g., the processor 1020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
a display;
a communication circuit;
a memory; and
at least one processor,
wherein the at least one processor is configured to:
receive, from a first server, a list of at least one external device registered in the first server and display the list through the display,
receive an input for selecting a first external device of which a power has been turned off, the first external device being included in the list,
transmit a control signal for causing the first external device to turn on the power to the first external device through the first server,
acquire information for providing real-time content to the first external device from a second server,
generate real-time content data,
upload the real-time content data to the second server through the communication circuit while generating the real-time content data, and
transmit at least a part of the information to the first external device through the first server such that the first external device acquires the real-time content data.

2. The electronic device of claim 1, wherein the first external device is registered in the first server using a first account of a user of the electronic device.

3. The electronic device of claim 2, wherein the first external device is registered in the second server using a second account of the electronic device.

4. The electronic device of claim 1, wherein the at least one processor is further configured to:
acquire first address information and second address information for providing real-time content from the second server to the first external device,
upload the real-time content data to the second server based on the first address information, and
transmit the second address information to the first external device through the first server.

5. The electronic device of claim 1, wherein the at least one processor is further configured to:
receive status information of a power of the list of at least one external device from the first server, and
output the list and the status information of the power through the display.

6. The electronic device of claim 1, wherein the at least one processor is further configured to:
store the real-time content data in the memory when generation of the real-time content data is finished.

7. The electronic device of claim 6, wherein the at least one processor is further configured to:
display an interface for determining whether to store the generated real-time content data through the display when the generation of the real-time content data is finished.

8. The electronic device of claim 1, further comprising:
a camera,
wherein the at least one processor is further configured to:
perform recording using the camera,
upload real-time video data generated by the recording to the second server while the recording is being performed, and
transmit the at least a part of the information to the first external device through the first server such that the first external device acquires the real-time video data.

9. The electronic device of claim 1, further comprising:
a microphone,
wherein the at least one processor is further configured to:
perform recording using the microphone,
upload real-time speech data generated by the recording to the second server through the communication circuit while the recording is being performed, and
transmit the at least a part of the information to the first external device through the first server such that the first external device acquires the real-time speech data.

10. An electronic device comprising:
a display;
a communication circuit;
a memory; and
at least one processor,
wherein the at least one processor is configured to:
receive a sharing request of an external device for real-time content from a first server and display a notification for the sharing request through the display,
turn on a power of the electronic device when the sharing request is received from the first server while the power of the electronic device is turned off,
acquire address information from the first server when a confirmation input is received in response to the notification, and
access a second server based on the address information and receive real-time content data from the second server.

11. The electronic device of claim 10, wherein the electronic device is registered in the first server using an account of a user of the external device.

12. The electronic device of claim 10, wherein the at least one processor is further configured to:
store information associated with the sharing request in the memory when the confirmation input is not received for a specified period of time in response to the notification.

13. The electronic device of claim 12, wherein the information associated with the sharing request includes an account of a user of an external device that is registered in the first server and has transmitted the sharing request.

* * * * *